May 26, 1970 R. A. THIBAULT 3,513,688

PNEUMATIC MICROMETRIC GAUGES

Filed Nov. 18, 1968

United States Patent Office 3,513,688
Patented May 26, 1970

3,513,688
PNEUMATIC MICROMETRIC GAUGES
Robert André Thibault, Cernay-la-Ville, France, assignor to Ateliers de Normandie
Filed Nov. 18, 1968, Ser. No. 776,703
Claims priority, application France, Dec. 6, 1967, 131,103
Int. Cl. G01b 13/10
U.S. Cl. 73—37.9      3 Claims

ABSTRACT OF THE DISCLOSURE

In a pneumatic micrometric gauge two pipelines are intended to be supplied in parallel from the same source of compressed gas respectively through two equal calibrated orifices with the orifices connecting with the atmosphere. An outlet orifice is provided in at least one of the pipelines for measuring the proximity of a wall. A chamber is connected to both pipelines and is sealingly divided by a freely movable pressure sensitive wall and rods are connected to both sides of the movable wall and have tapered portions axially movable in opposition in cylindrical outlet orifices in the pipelines and connecting with the atmosphere.

---

The invention relates to pneumatic micrometric gauges of the type described in United States of America patent specification No. 3,046,778, i.e. comprising two pipelines, to be supplied in parallel from the same compressed gas source, and having outlet orifices to the atmosphere, one at least of these pipelines being fitted with an outlet orifice serving to measure the proximity of a wall, while these two pipelines are joined by a chamber sealed and divided by a freely movable wall and connected to a rod having a tapered portion axially movable in a cylindrical orifice connecting with the atmosphere, in the other of the said pipelines.

Devices of this type have a determined measuring margin which cannot be increased beyond a certain maximum for a given use without detracting from the efficient operation of the device, as will be explained in detail later. Now, these measuring margins are often insufficient for certain uses.

The object of the invention is to improve pneumatic micrometric gauges of the type in question with a view to increasing their measuring margin, while fulfilling the proportional conditions of the movements of the tapered portion, and of the variations in the cross-sections of the orifices, as well as satisfying the conditions of low compressed air consumption and efficient functioning of the device.

To this end, according to the invention, there is provided a pneumatic micrometric gauge comprising two pipelines intended to be supplied in parallel from the same source of compressed gas, two equal calibrated orifices through respective ones of which the pipelines can be supplied with the compressed gas, orifices connecting with the atmosphere, an outlet orifice in at least one of the pipelines for measuring the proximity of a wall, a chamber connected to both said pipelines, a freely movable sealed pressure sensitive wall dividing the chamber, rods connected to both sides of the movable wall and having tapered portions axially movable in opposition in cylindrical outlet orifices in the pipelines and connecting with the atmosphere.

Under these circumstances, as will be likewise explained later, the required conditions of proportionalty are fulfilled.

The invention will now be described, by way of example, with reference to the accompanying drawings, in which.

Figure 1:
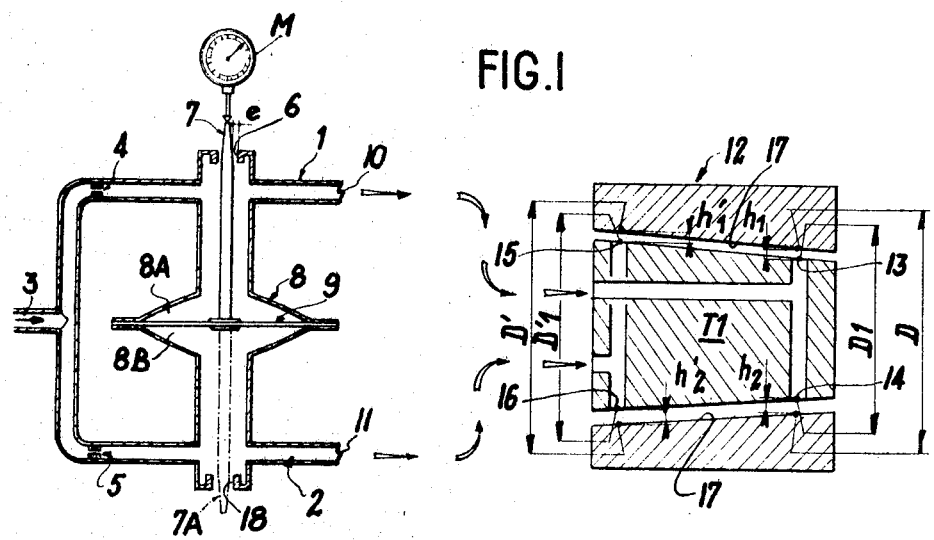
FIG. 1 shows schematically the assembly of the device fitted with a plug for measuring the conicity of a bore.

The pneumatic micrometric gauge shown schematically in FIG. 1 comprises two pipelines 1, 2 intended to be supplied in parallel from the same compressed gas source 3, respectively through two equal calibrated inlet orifices 4 and 5. One of the two pipelines, pipeline 1 which is the regulating pipeline in the example shown, has a primary outlet orifice 6 to the atmosphere, in which is mounted a tapered portion 7 axially movable in the said orifice so as to modify the effective section of the latter, and forming a part of a rod integral with a very flexible diaphragm 9, which is capable of being deformed, without strain, in a chamber 8. The diaphragm 9 sealingly divides the interior of the chamber 8 into two compartments 8A and 8B linked respectively to the two pipelines 1 and 2.

The other pipeline, or measuring pipeline 2, is fitted with an outlet orifice 11 to the atmosphere by a measuring jet, while the regulating pipeline 1 is fitted with another outlet orifice 10 to the atmosphere. For certain uses, the outlet orifice 10 of the regulating pipeline 1 is of constant cross-section, and only one measuring orifice, i.e. 11 of pipeline 2, is used with the device. For other uses, i.e. differential measurement, which will be returned to later, both outlet orifices 10 and 11 of both measuring and regulating pipelines are joined to orifices for measuring the proximity of a wall. Besides, measuring pipeline 2 is fitted with at least one other outlet orifice 18 leading to the atmosphere. In any case, the measurement is read off on the indicating instrument M joined to the tapered portion 7 which is moved by the diaphragm 9 under the influence of the differential pressure to which it is subjected before attaining its position of equilibrium for which the pressure is the same for both pipelines, both inlet jets 4 and 5 being identical.

It will be shown that the device has a defined measuring range which, for a given use, cannot be increased beyond a certain maximum without detracting from the efficient operation of the device.

To this end, two examples will be given, the first relating to a measurement of conicity of the bore of a part, and the second to the distance between the axes of the bores of a connecting rod.

For measuring the conicity of the bore 17 of a part, use is made of the plug T1 shown in FIG. 1, comprising two orifices 13 and 14 connected in parallel and joined to the regulating pipeline 1, and two orifices 15 and 16, connected in parallel and joined to measuring pipeline 2. Orifices 13, 14, 15, 16 are identical, and made up, for example, of circular holes of diameter $d$ placed a short distance from the walls of cone 17, which is to be measured. Now, orifice 18 has a cross-section $S_0$, equal to the annular cross-section of orifice 6 when diaphragm 9 is in the middle of its total stroke; this orifice is in parallel with outlet orifices 15, 16 of the measuring branch.

Reference $d_0$ indicates the diameter of the cross-section of the conical portion 7 in the plane of orifice 6 when diaphragm 9 is in the middle of its stroke. Let $a$ be the half-angle to the peak of the tapered portion 7, and $x$ the travel of the conical portion parallel to its axis, calculated positively in the direction of the increases in the annular cross-section 6, from the mid-position of the diaphragm. For a given position of the tapered portion, defined by a given value of $x$, the surface of the annular cross-section 6 is:

$$S_0 + \frac{\pi}{4}[d_0^2 - (d_0 - 2xtga)^2] = S_0 + \pi d_0 xtga\left(1 - \frac{xtga}{d_0}\right)$$

Let $h_1$ and $h_2$ be the distances of orifices 13 and 14 to the wall 17, $h_1'$ and $h_2'$ the distances of orifices 15 and 16 to wall 17. When diaphragm 9 is in equilibrium, the total cross-sections of the outlet orifices of both branches are equal, and, in consequence, one obtains:

$$S_0 + \pi d_0 xtga\left(1 - \frac{xtga}{d_0}\right) + \pi d(h_1 + h_2) = \pi d(h_1' + h_2') + S_0$$

that is to say:

$$d_0 xtga\left(1 - \frac{xtga}{d_0}\right) = d[(h_1' + h_2') - (h_1 + h_2)]$$

If one calls D the diameter of cone 17 in line with orifices 13 and 14, and D' the diameter of cone 17 in line with orifices 15 and 16, it is easily seen that:

$$(h_1' + h_2') - (h_1 + h_2) = D' - D + D_1 - D_1'$$

$D_1$ and $D_1'$ indicating the diameters of the unitor measuring plug in line with orifices 13 and 14 on one hand, and 15 and 16 on the other. In consequence:

$$x\left(1 - \frac{xtga}{d_0}\right) = \frac{d}{d_0 tga}(D' - D + D_1 - D_1')$$

This expression leads to the conclusion that the travel of portion 7 is therefore only proportional to variations in $(D'-D)$ on conditions that $xtga/d_0$ is negligibly below 1.

Now, the amplitude of movements of the diaphragm one way or another from its mid-position is necessarily limited because no tensions must be created in this diaphragm, which must remain supple and pliable in all its positions. The values of $x$ are therefore limited to $\pm x_0$, indicating by $x_0$ half of the total admissible travel of the diaphragm. Within the limits of the variations in $x$ thus defined, if it is desired to have $x$ proportional to the variations in $D'-D$ with an approximation leading to a maximum relative error of 1/100, e.g. $x_0 tga/d_0$ must equal 1/100.

For given values of $x_0$ and $d_0$, the maximum value $a_0$ of $a$, such as $tga_0$, is equal to $d_0/100x_0$, is thus determined and, if this maximum value of the angle $a$ of the tapered portion is adopted, the amplitude of the measurable variations of $(D'-D)$, which shall be called the measuring range, is $\pm d_0/100d$.

Now, for a given use, the minimum value of $d$ is imposed, and also the maximum value of $d_0$ and, consequently, the maximum value of the measuring range is imposed.

In effect the values of $h_1$, $h_2$, $h_1'$, $h_2'$ must not exceed $d/10$, so that the output of an orifice is proportional to the distance to the wall facing it, an essential factor to ensure that the measurement of $(D'-D)$ does not depend on the position of cone 17 in the measuring unit; the minimum value of $d$ is thus equal to ten times the tolerance on diameters D and D'.

The diameter $d$ being thus chosen, and the values of $h_1$, $h_2$, $h_1'$, and $h_2'$ being defined by the tolerances on diameters D and D', the total outlet cross-section of the orifices 13 and 14 on one hand, and 15 and 16 on the other, of the measuring unit, varies within perfectly defined limits. Now, this cross-section is practically equal to the product of the length of the circumference of the diameter $d_0$ by the distance $e$ of the edges of the circular orifice 6 to the surface of tapered portion 7, and this distance must not be less than about 10 microns, so that the output of the annular orifice is proportional to the travel $x$ of the tapered portion; the maximum value of $d_0$ is thus imposed, equal to the quotient of the minimum cross-section of the annular orifice by the minimum admissible value of $\pi e$.

Figure 2:
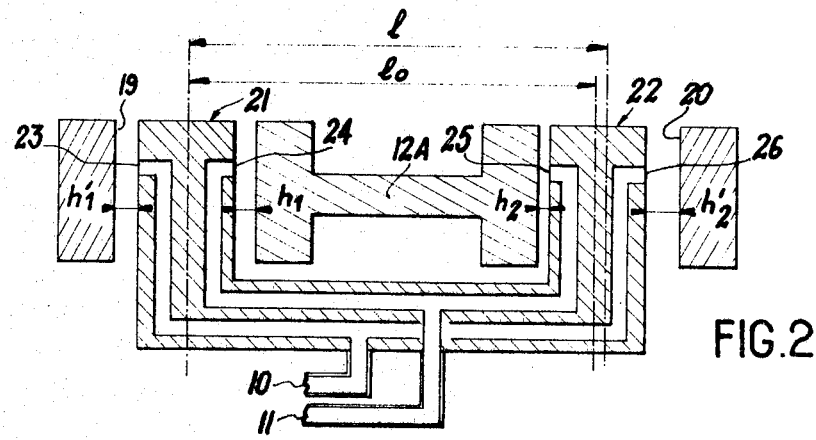
FIG. 2 shows an inter-axial measuring plug which can be used with the device in FIG. 1.

The case of measurement of the distance between the axes of two bores will now be considered. The measuring unit T2 is shown in FIG. 2. The task is to determine the distance $l$ between the parallel axes of two bores 19 and 20, of a connecting rod 12A. For this purpose two plugs 21 and 22 are used, rigidly attached one to the other, their parallel axes being at a distance $l_0$ from one another, a distance that differs little from $l$. Plugs 21 and 22 are introduced into the bores 19 and 20 respectively, and each comprise two measuring orifices 23, 24 for plugs 21, 25, 26 for plug 22. Orifices 23 and 26 are arranged in parallel and joined by junction 10 to the regulating branch 1, and by junction 11 to the measuring branch 2 of the gauge.

References $h_1$ and $h_2$ indicate the distances from orifices 24 and 25 to the walls of the bores 19 and 20; $h_1'$ and $h_2'$ are the distances from orifices 23 and 26 to the walls of these same bores. It can easily be seen that:

$$(h_1' + h_2') - (h_1 + h_2) = 2(l - l_0)$$

Now, according to the calculation involving the measurement of conicity, one obtains:

$$(h_1' + h_2') - (h_1 + h_2) = xtgad_0/d$$

It will therefore be seen that, with the same gauge, the measuring range of the variations of $l$ equals half the measuring range of a conicity.

Both these examples show that the maximum measuring range is determined for a given use. For example, for $d_0 = 3$ mm. and $d = 2$ mm. the measuring range is $\pm 45$ microns in the case of measurement of a conicity and $\pm 22.5$ microns in the case of measurement of the distance between the axes of two bores.

These measuring ranges are often insufficient for certain uses, and the object of the invention aims precisely at increasing them, while fulfilling the conditions of proportionality, of low compressed-air consumption, and of good functioning of the gauge.

To this end the measuring pipeline 2 is fitted with an adjustable outlet orifice to the atmosphere, having strictly the same characteristics as those of the adjustable orifice 6 of the regulating branch 1, but its variations in cross-section are in opposite to those of the latter orifice, i.e., in the circular orifice 18, e.g., there is mounted a tapered portion 7A of a rod also integral with the diaphragm 9 and directed in the direction opposite to that of portion 7. In general, portion 7 is subjected to the action of a weak return spring, so that portion 7A will be fitted with an identical return spring.

Figure 3:
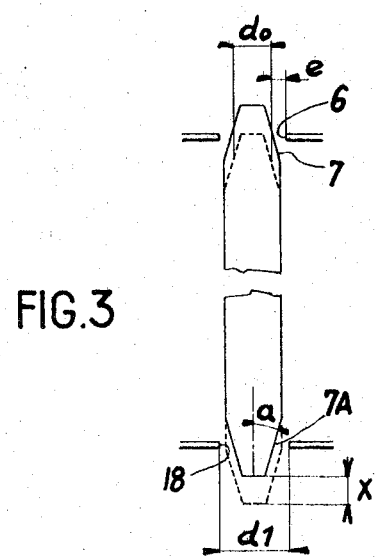
FIG. 3 shows schematically, on an enlarged scale, the shape of the regulating orifices with variable cross-section.

Under these circumstances, if, as shown in FIG. 3, one calls $d_0$ the medial diameter of portion 7, i.e. the diameter of its cross-section in line with orifice 6 when it is in the middle of its total course, $d_1$ the diameter of orifice 6, $a$ the half-angle at the summit of the conical surfaces of the portions, $x$ any axial travel of the latter, $S_m$ the sum of the cross-sections of the outlet orifices in the regulating pipeline 1 other than orifice 6, and $S_{m'}$ the sum of the cross-sections of the outlet orifices of the measuring pipeline 2 other than orifice 18, one can state that, at equilibrium, after a length of travel $x$ of both portions 7 and 7A simultaneously, the sum of the cross-sections of the outlet orifices of both pipelines is the same, i.e.

$$\frac{\pi}{4}[d_1^2 - (d_0 - 2xtga)^2] + S_m = \frac{\pi}{4}[d_1^2 - (d_0 + 2xtga)^2] + S_{m'}$$

whence: $S_{m'} - S_m = 2\pi d_0 xtga$.

It can thus be seen that the difference in the cross-sections of the orifices due to the variation in the side to be measured is quite proportional to the length of the common travel $x$ of both portions 7 and 7A, whatever the conicity of the latter, provided of course that they are identical. The result is that the measuring range is then no longer limited by anything but the sensitivity desired for the gauge, a sensitivity which obviously varies inversely as the measuring range.

I claim:
1. In a pneumatic gauge comprising a casing having a pair of gas chambers therein, means for admitting a restricted flow of gas under pressure into each of said chambers, and a pressure sensitive wall common to said chambers, one of said chambers having an outlet adapted to be disposed in proximity to a surface to be gauged and the other chamber having an outlet having a valve therein, said valve being connected with said wall for movement therewith to vary the rate of discharge of gas from said other chamber in accordance with the displacements of said wall, the improvement comprising a second outlet formed in said one chamber and receiving a second valve therein, said second valve being connected with said wall for movement therewith to vary the rate of discharge of gas from said one chamber through said second outlet thereof in accordance with the displacements of said wall, and said second valve being arranged to vary the rate of discharge of gas through the corresponding outlet inversely of the variations of the discharge of gas through said outlet of said one chamber.

2. A pneumatic gauge according to claim 1, wherein said other chamber has a second outlet adapted to be disposed in proximity to a surface to be gauged.

3. A pneumatic gauge according to claim 1, wherein said pressure sensitive wall is made of pliable substantially non-elastic folding material.

References Cited

UNITED STATES PATENTS

| | | | |
|---|---|---|---|
| 2,792,569 | 5/1957 | Byrkett | 73—37.5 XR |
| 3,046,778 | 7/1962 | Fortier | 73—37.5 |

LOUIS R. PRINCE, Primary Examiner

W. A. HENRY II, Assistant Examiner